United States Patent
Zhang

(10) Patent No.: US 12,032,458 B2
(45) Date of Patent: Jul. 9, 2024

(54) RESILIENT AND ADAPTIVE CLOUD PROCESSING OF PARALLEL COMPUTING WORKLOADS

(71) Applicant: Microsoft Technology Licensing, LLC, Redmond, WA (US)

(72) Inventor: Qie Zhang, Houston, TX (US)

(73) Assignee: Microsoft Technology Licensing, LLC, Redmond, WA (US)

(*) Notice: Subject to any disclaimer, the term of this patent is extended or adjusted under 35 U.S.C. 154(b) by 238 days.

(21) Appl. No.: 17/547,212

(22) Filed: Dec. 9, 2021

(65) Prior Publication Data
US 2023/0185682 A1 Jun. 15, 2023

(51) Int. Cl.
G06F 11/20 (2006.01)
G06F 9/455 (2018.01)
G06F 9/50 (2006.01)

(52) U.S. Cl.
CPC ........ *G06F 11/203* (2013.01); *G06F 9/45558* (2013.01); *G06F 9/5077* (2013.01); *G06F 2009/4557* (2013.01); *G06F 2009/45591* (2013.01); *G06F 2009/45595* (2013.01); *G06F 2201/815* (2013.01)

(58) Field of Classification Search
CPC .. G06F 11/203; G06F 9/45558; G06F 9/5077; G06F 2009/4557; G06F 2009/45591; G06F 2009/45595; G06F 2201/815; G06F 11/1484

USPC ...................................................... 714/4.11
See application file for complete search history.

(56) References Cited

U.S. PATENT DOCUMENTS

| 7,756,919 B1* | 7/2010 | Dean .................. G06F 16/2379 709/201 |
| 2020/0285502 A1* | 9/2020 | Hildebrand ......... G06F 9/45554 |

OTHER PUBLICATIONS

"Azure Spot Virtual Machines", Retrieved from: https://web.archive.org/web/20211024201821/https://azure.microsoft.com/en-US/services/virtual-machines/spot/, Oct. 24, 2021, 15 Pages.

(Continued)

*Primary Examiner* — Yair Leibovich
(74) *Attorney, Agent, or Firm* — Workman Nydegger

(57) ABSTRACT

The disclosed technology is generally directed to the processing of parallel computing jobs. In one example of the technology, for at least a first cluster of virtual machines that is assigned to a job, an initial assignment of at least one virtual machine to a parallel-computing job is made. Workers are assigned to tasks associated with the job. Upon failure of a task by one of assigned workers, the failed task is re-submitted. Upon detecting the failure of one of the workers assigned to the job, the failed worker is replaced with a replacement worker. Work associated with the failed worker is re-allocated to the replacement worker. Responsive to removal of a virtual machine assigned to the job, a new virtual machine is assigned to the job. Outputs are provided from the assigned workers.

19 Claims, 5 Drawing Sheets

(56) References Cited

OTHER PUBLICATIONS

"SEG/EAGE Salt and Overthrust Models", Retrieved from: https://wiki.seg.org/wiki/SEG/EAGE_Salt_and_Overthrust_Models, Jun. 26, 2019, 3 Pages.
Aminzadeh, et al., "SEG/EAGE 3-D Salt Overthrust Models", In Publication of Society of Exploration Geophysicists, 1997, 11 Pages.
Zhang, et al., "Hyperwavve: A Cloud-Native Solution for Hyperscale Seismic Imaging on Azure", In Conference of International Meeting for Applied Geoscience & Energy, Sep. 26, 2021, pp. 782-786.

* cited by examiner

RESILIENT AND ADAPTIVE CLOUD PROCESSING OF PARALLEL COMPUTING WORKLOADS

BACKGROUND

Various approaches may be used in performing parallel computing jobs. For example, MapReduce is one possible approach to performing parallel computing jobs. Typically, a MapReduce programming framework performs distributed and parallel processing on large datasets in a distributed environment. A MapReduce programming framework is typically composed of a map procedure, where each worker applies a user-defined map function to local data, and a reduce step, which aggregates the outputs from the map procedure. A MapReduce programming framework typically allows for the distributed processing of the map and reduction operations, where both map and reduce can be performed in parallel, provided that the operation is independent. A MapReduce program may be used to solve a large and complex problem such as simulation or inversion through parallelization on a node cluster.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to the processing of parallel computing jobs. In some examples, for at least a first cluster of virtual machines that is assigned to a first job, an initial assignment of at least one virtual machine in the first cluster of virtual machines to the first job is made. In some examples, the first job is a parallel-computing job. In some examples, for at least the first cluster of virtual machines that is assigned to the first job, workers are assigned to a plurality of tasks that is associated with the first job. In some examples, the workers are associated with the virtual machines that are assigned to the first job. In some examples, upon failure of a task of the plurality of tasks by one of assigned workers, the failed task is re-submitted. In some examples, a failure of one of the workers assigned to the first job is detected. In some examples, upon detecting the failure of one of the workers assigned to the first job, the failed worker is replaced with a replacement worker. In some examples, work associated with the failed worker is re-allocated to the replacement worker. In some examples, for at least the first cluster of virtual machines that is assigned to the first job, responsive to removal of a virtual machine among the virtual machines assigned to the first job, a new virtual machine is assigned to the first job. In some examples, outputs are provided from the assigned workers.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
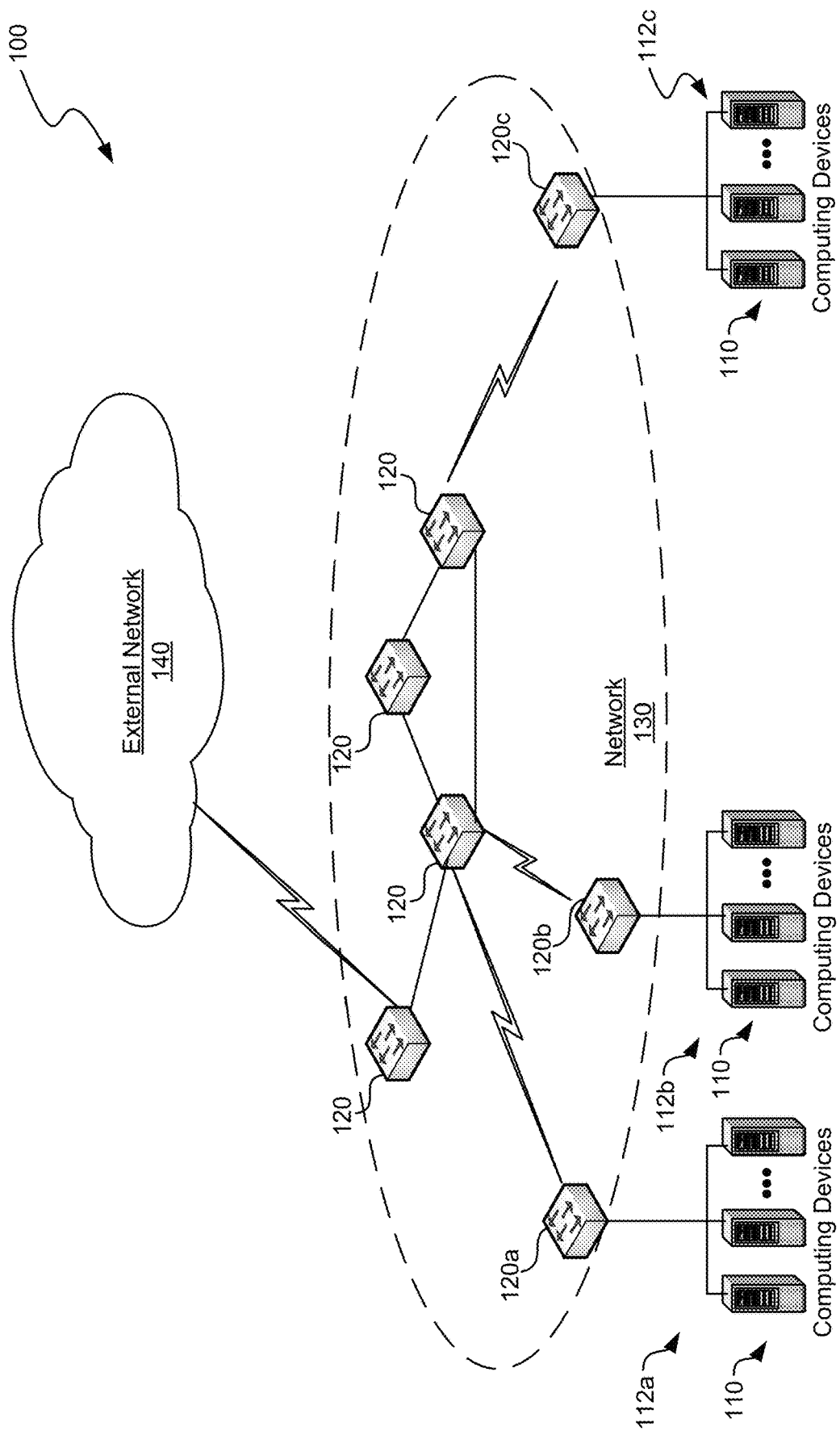
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to the processing of parallel computing jobs. In some examples, for at least a first cluster of virtual machines (VMs) that is assigned to a first job, an initial assignment of at least one virtual machine in the first cluster of virtual machines to the first job is made. In some examples, the first job is a parallel-computing job. In some examples, for at least the first cluster of virtual machines that is assigned to the first job, workers are assigned to a plurality of tasks that is associated with the first job. In some examples, the workers are associated with the virtual machines that are assigned to the first job. In some examples, upon failure of a task of the plurality of tasks by one of assigned workers, the failed task is re-submitted. In some examples, a failure of one of the workers assigned to the first job is detected. In some examples, upon detecting the failure of one of the workers assigned to the first job, the failed worker is replaced with a replacement worker. In some examples, work associated with the failed worker is re-allocated to the replacement worker. In some examples, for at least the first cluster of virtual machines that is assigned to the first job, responsive to removal of a virtual machine among the virtual machines assigned to the first job, a new virtual machine is assigned to the first job. In some examples, outputs are provided from the assigned workers.

In some examples, a service is provided that performs a parallel processing job in the cloud on behalf of a client. In some examples, the service enables the job to be performed on the cloud via spot VMs, allowing significant relative savings. In some examples, a spot VM is a low-priority VM that can be evicted at any time, but which may be available to a client at a significantly lower price than a standard VM, such as 90% savings relative to a standard VM. In some examples, the price is significantly reduced because, by using a spot VM, a client can make use of resources that are otherwise being unused. In some examples, if the resources of the spot VM could be used elsewhere, then the spot VM is evicted. Typically, there is a relatively short notice given for a spot VM before eviction, such as notice given 30 seconds prior to eviction.

In some examples, when a parallel processing job is received, a scheduler is set up, a local VM sets up the parallel processing problem, at least one cluster is initiated and assigned to the job, and the scheduler client communicates with the cluster(s). Multiple clusters may be assigned depending on the resource requirements of the job. In some examples, each assigned cluster starts with a minimal number of spot VMs. The number (i.e., quantity) of VMs assigned to the job may be managed according to the resource requirements of the job in order to achieve autoscaling.

Fault tolerance may be automatically achieved by the system as follows. First, failed workers may be detected, with the failed worker being replaced either by resetting the worker or by assigning a new worker. The work associated with the failed worker may be re-allocated to the replacement worker (whether a new worker or the same worker). Second, failed tasks may be detected, and then detected failed tasks may be re-submitted or reallocated. Third, if a problem with a VM is detected, including, for example, a failed VM, removed VM, or a VM that is about to be evicted, a new VM may be assigned to the job.

In this way, processing of the job may be elastic and interruptible, and may be performed on spot VMs, because work assigned to evicted VMs may be re-allocated.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be part of a system for resilient and adaptive cloud processing of parallel computing workloads.

Illustrative Computing Device

Figure 2:
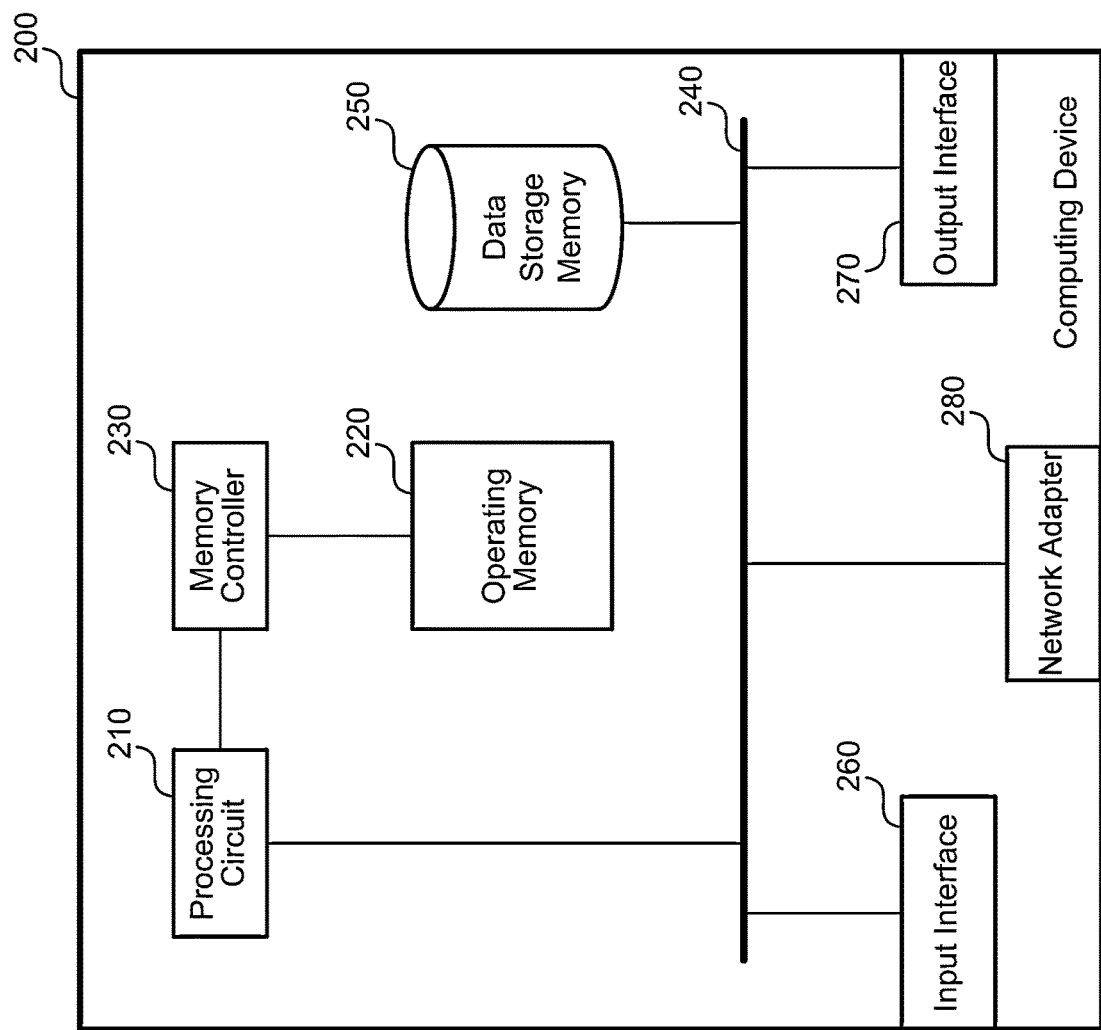
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 4:
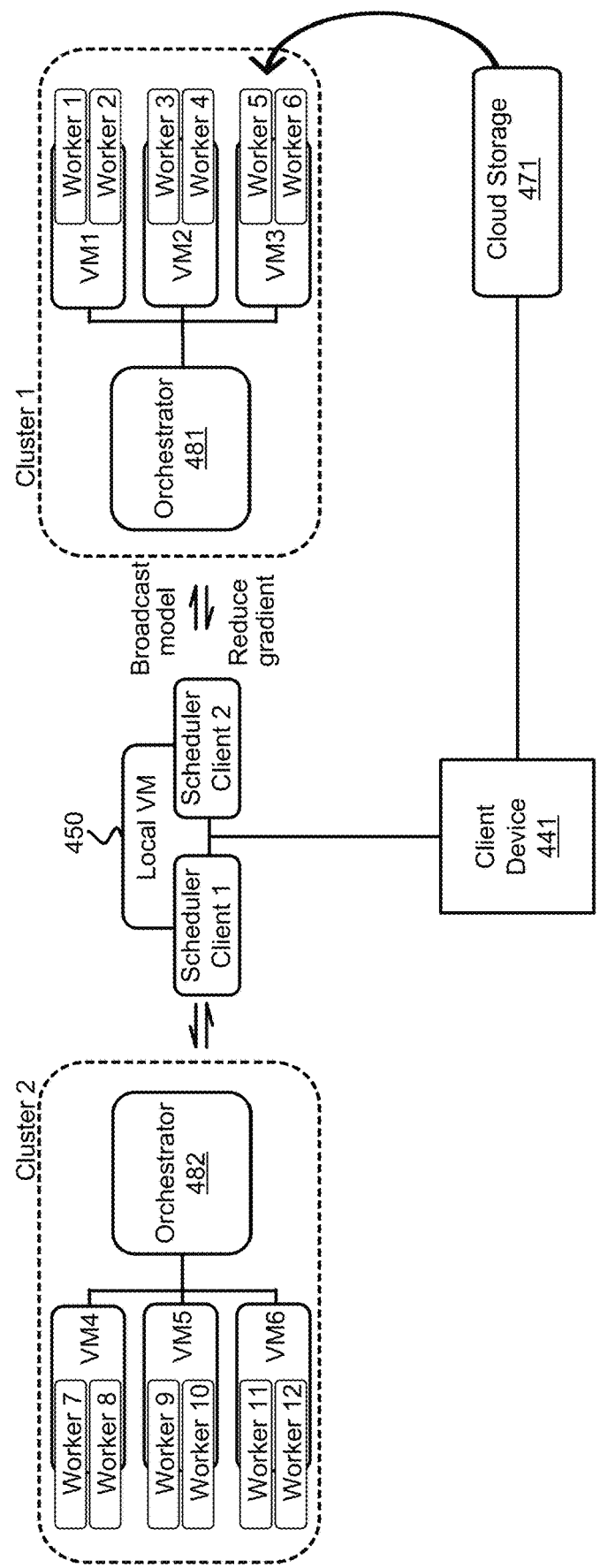
FIG. 4 is a block diagram illustrating an example of a system for resilient and adaptive cloud processing of parallel computing workloads.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such the process shown in FIG. 4, as discussed in greater detail below.

Illustrative Systems

Figure 3:
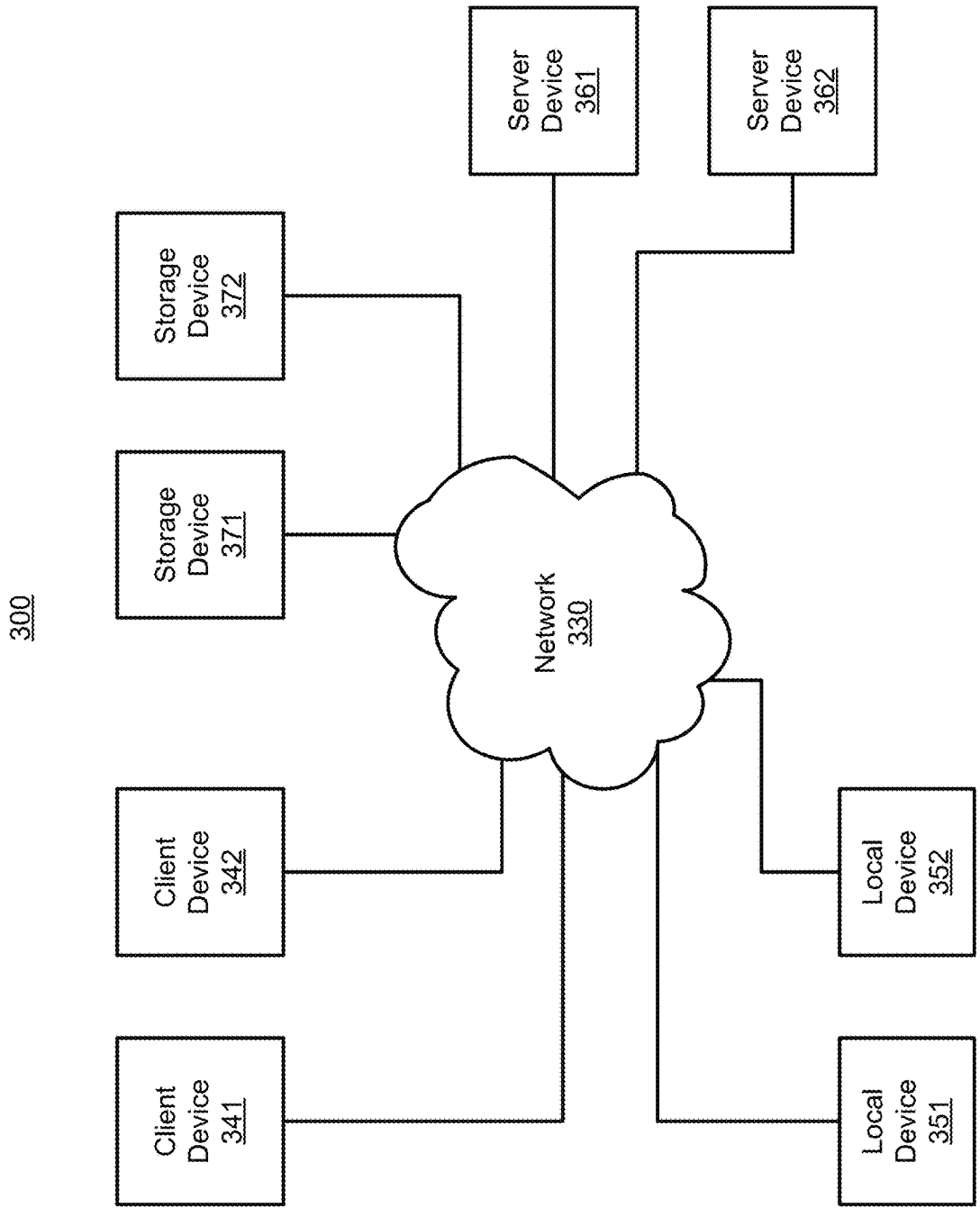
FIG. 3 is a block diagram illustrating an example of a network-connected system.

FIG. 3 is a block diagram illustrating an example of a system (300). System 300 may include network 330, as well as client devices 341 and 342; local devices 351 and 352; server devices 361 and 362; and storage devices 371 and 372, which, in some examples, all connect to network 330.

Each of client devices 341 and 342; local devices 351 and 352; server devices 361 and 362; and storage devices 371 and 372 may include examples of computing device 200 of FIG. 2. FIG. 3 and the corresponding description of FIG. 3 in the specification illustrate an example system for illustrative purposes that does not limit the scope of the disclosure. In some examples, local devices 351 and 352 are part of one or more distributed systems, server devices 361 and 362 are part of one or more distributed systems, and/or storage devices 371 and 372 are part of one or more distributed systems.

In some examples, one or more client devices such as client device 341 or client device 342 may be used by clients to communicate parallel computing jobs to a service. In some examples, one or more local devices, such as local device 351 and 352, may operate one or more local VMs on behalf of clients. In some examples, one or more server devices 361 and 362 may act as a distributed system to perform services on behalf of clients. In some examples, one or more storage devices, such as server device 371 and 372, may perform storage services on behalf of clients, including storing data to be used in parallel computing problems.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342; local devices 351 and 352; server devices 361 and 362; and storage device 371 and 371. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

In some examples, a client that has a parallel processing job to be performed may use one or more client devices (e.g., client devices 341 and 342) to communicate the parallel computing problem to a local VM that is operated by one or more local devices (e.g., local device 351 and 352), and communicate information that is associated with the parallel computing problem to a storage service that is operated by one or more storage devices (e.g., storage device 371 and 372). In some examples, a scheduler may be set up in the local VM, and at least one cluster may be started up in one or more distributed server services run by server devices (e.g., server devices 361 and 362). Each cluster may start with a minimum number of assigned VMs. The number of VMs assigned to the job may be managed according to the resource requirements of the job in order to achieve autoscaling. The VMs may achieve fault tolerance as discussed in greater detail above and below. Outputs may be received from the assigned VMs, and the outputs may then be processed accordingly to the job.

System 300 may include more or less devices than illustrated in FIG. 3, which is shown by way of example only.

FIG. 4 is a block diagram illustrating an example of a system (400). System 400 may be an example of a portion of system 300 of FIG. 3. System 400 may be a system for resilient and adaptive cloud processing of parallel computing workloads. System 400 may include client device 441, local VM 450, Cluster 1, Cluster 2, and cloud storage 471. Client device 441 may be an example of client device 341 of FIG. 3. Local VM 450 may be executed on or more examples of local devices such as examples of local device 351 and/or 352 of FIG. 3. Cluster 1 and cluster 2 may be clusters of virtual machines, along with other supporting services, executing on one or more server devices, such as examples of server devices 361 and/or 362 of FIG. 3. Cloud storage 471 may be an example of storage device 371 of FIG. 3.

In some examples, local VM 450 may execute scheduler client 1 and/or scheduler client 2. In some examples, orchestrator 481 and VMs VM1-VM3 may execute on Cluster 1, and orchestrator 482 and VMs VM4-VM6 may execute on Cluster 2. In some examples, workers worker 1 and worker 2 may execute on VM1, workers worker 3 and worker 4 may execute on VM2, workers worker 5 and worker 6 may execute on VM3, workers worker 7 and worker 8 may execute on VM4, workers worker 9 and worker 10 may execute on VM5, workers worker 11 and worker 12 may execute on VM6.

Examples of system 400 may be used for parallel computing jobs, including, for example, jobs that are capable of being processed by a MapReduce process, jobs with Message Passing Interface (MPI) workloads, high-performance computing (HPC) jobs, visual rendering jobs, simulation problems, inversion problems, scientific computing problems, and/or other suitable jobs. HPC may be run on many types of workloads, including, among others, "embarrassingly parallel workloads" and "tightly coupled workloads." "Embarrassingly parallel workloads" involve computational problems that are divided into small, simple, and independent tasks that can be run at the same time, often with little or no communication between them. "Tightly coupled workloads" involve computational problems that take a large shared workload and break it into smaller tasks that communicate continuously. Typically, a parallel computing job may be processed with a MapReduce process or other suitable process.

In various example of the disclosure, system 400 may enable a parallel computing job to be processed in the cloud in a manner that is scalable, resilient, fault tolerant, auto-scaling, elastic, and able to continue in spite of interruptions. In some examples, system 400 may be used with spot VMs, because work allocated to spot VMs that are to be evicted may be re-allocated in a resilient and fault tolerant manner. In some examples, even if the job performed by system 400 were halted for a significant period of time, such as, for example, several hours, as a result of no resources being available to the use of spot VMs, a hyperscale job can still be completed even though the job was halted for a significant period of time. Examples of system 400 may be used for hyperscale HPC workloads, including, as but one example, seismic imaging HPC workloads, such as hyperscale production-size 3D Full Waveform Inversion.

In some examples, client device 441 may communicate a parallel computing job to local VM 450. When local VM 450 receives the job from client device 441, local VM 450 may, responsive to receiving the paralleling computing job, set up the parallel computing problem, determine how many clusters should be used for the job, and then cause one or more clusters to be initiated and to be assigned to the job (such as Cluster 1 and Cluster 2). In some examples, as part of setting up the parallel computing problem, local VM 450 may formulate a procedure for the job. The local VM may set up one or more scheduler clients, such as scheduler client 1 and scheduler client 2. In some examples, one scheduler client is set up for each of the assigned clusters, with each scheduler client having a corresponding assigned cluster. The local VM may then determine one or more model(s) associated with the job, and determine tasks that are to be performed for the job. The model(s) may be created for use in a Map function. The local VM may perform these actions in different orders in various example.

One or more of the scheduler clients may communicate with one or more clusters to assign one or more clusters (e.g., Cluster 1 and Cluster 2) to the job. In some examples, each of the corresponding scheduler clients in local VM 450 may broadcast the model to each assigned cluster, and also communicate the tasks to the clusters. Initially, each scheduling client may communicate to each corresponding cluster to assign one or more initial VMs in the cluster to the jobs. In some examples, only one or two VMs are assigned to the job from each cluster initially. As discussed in greater detail below, in some examples, more VMs may be automatically assigned later depending on the resource requirements of the job.

In some examples, each cluster includes an orchestrator, such as orchestrator 481 of cluster 1, orchestrator 482 of cluster 2, and/or the like. In some of these examples, each scheduler client in local VM 450 communicates with the corresponding orchestrator, and the orchestrator manages the VMs in the cluster. However, in other examples, the clusters do not include orchestrators, and instead the corresponding scheduler client for each cluster communicates directly to the VMs, or communicates with the VMs through one or more intermediaries other than an orchestrator. In some examples that do not include orchestrators in the clusters, the functionality described as being by the orchestrators in some examples may instead be performed the by the scheduler client, by a service in the cluster that is not an orchestrator, by another suitable entity, or by one or more of the preceding entities working together.

In some examples, in each cluster an orchestrator (or other entity, as discussed above) manages VMs in that cluster. Each VM in the cluster may control one or more workers (e.g., VM1 controls worker 1 and worker 2 in some examples). In some examples, workers may be assigned tasks associated with the job, according to the model(s). In some examples, the orchestrators may also operate as load balancers. In some examples, the orchestrators may also operate as master nodes, with the VMs operating as slave nodes.

Each cluster may be a cluster of VMs, where each VM may operate as a node. Each VM node may deploy one or more workers. In some examples, each of the workers is a container instance. Applications may run inside of the containers to execute workloads associated with the job. The container instances are containerized software processes that are orchestrated by the orchestrator (e.g., orchestrator 481 for container instances in Cluster 1) in some examples. In other examples, one or more workers may instead be another suitable type of worker, such as, for example, a non-containerized software process.

In some examples, each of the assigned workers may read input data from cloud storage 471, as enabled by one or more entities in system 400, and each of the assigned workers may apply the Map function to the input data, and provide an output to the Map function. In some examples, each of the workers on the cluster may then redistribute data based on output keys produced by the Map function so that all data belonging to one key is located on the same worker. In some examples, the workers may then perform a Reduce function on the outputs.

In some examples, in each cluster, the outputs of the reduce function from the workers are then be sent from the cluster to local VM 450. In some examples, the output provided from the clusters to local VM 450 are gradients provided as the output of the Reduce functions. In other examples, the other suitable results may be output provided from clusters to the local VM according to the particular job and the particular problem determined by local VM 450. Some types of parallel jobs may require mapping but not reducing. Local VM 450 may then provide the final processing to the outputs received from each of the clusters to complete processing of the job.

System 400 may achieve scaling in multiple ways. One of the ways that system 400 may achieve scaling is by the capability of assigning as many clusters as are needed to perform the job, and by instantiating a separate corresponding scheduler client for each assigned cluster. In some examples, each cluster can have a maximum of 1,024 VMs, and so the number of clusters to be assigned may be determined accordingly based on the resource requirements of the job. In some examples, some or all of the clusters may be in the same approximate geophysical locations as each other. In other examples, different clusters may be in different geographic regions, with different clusters distributed in different data centers throughout the world.

One way that system 400 may achieve scalability is through auto-scaling the number of VMs assigned to the job. The number of VMs assigned to the job each in each cluster may automatically be increased or reduced according to the resource requirements of the job. In some examples, as more VMs and/or workers are needed, more VMs and/or workers are added. In some examples, as tasks are finished, the number of VMs are reduced. In some examples, the orchestrator in the cluster (e.g., orchestrator 481 for cluster 1) may manage, deploy, and scale the VMs in the cluster. In some examples, the corresponding scheduler client (e.g., scheduler client 1 or scheduler client 2) may determine the number of VMs that should be used in the cluster, communicate the number of VMs that should be used to the orchestrator in the cluster, and the orchestrator manages the VMs so that the determined number of VMs are assigned to the job in the cluster.

The automatic scaling may include both increasing and decreasing the number of assigned VMs. For instance, in some examples, in each cluster, when the compute resources for the job are under-scheduled, one or more new virtual machines are automatically initiated and assigned to the job. Similarly, in some examples, in each cluster, when the compute sources for the job are over-scheduled, one or more virtual machines assigned to the job are automatically removed and stopped.

System 400 may achieve fault tolerance, including resilience to hardware and/or software failures and re-scaling, in multiple ways.

For instance, in some examples, in each cluster, the orchestrator automatically detects whether any of the VMs in the cluster has failed, been removed, is about to be evicted, or the like. Each is these potential types of issues with the VM is considered to be removal of the VM. If the orchestrator detects such removal of a VM that is assigned to the job, then, in some examples, the orchestrator will assign a new VM to the job. The VM monitoring and re-assignment may be performed by the orchestrator in the cluster, by another suitable service in the cluster, by the corresponding scheduler client in local VM 450, by another suitable entity, or by two or more of the preceding entities working together, in various examples.

In some examples, each of the assigned tasks is monitored, and a determination is made as to whether any of the tasks have failed. In various examples, this monitoring and determination may be performed by the orchestrator in the cluster, by another suitable service in the cluster, by the corresponding scheduler client in local VM 450, by another suitable entity, or by two or more of the preceding entities working together, in various examples. If a failure of one of the tasks is detected, then, in some examples, the failed task is re-submitted. In some examples, the failed task is re-submitted by the scheduler client, by a service in the cluster, or by another suitable entity. In some examples, the unfinished state of the task is maintained if possible, and the maintained state is passed along with the failed task. In other examples, the state is not maintained, and the failed task is re-submitted and restarted.

In some examples, a service monitors the workers assigned to the job, and determines whether any of the workers have failed. In various examples, this monitoring and determination may be performed by the orchestrator in the cluster, by another suitable service in the cluster, by the corresponding scheduler client in local VM 450, by another suitable entity, or by two or more of the preceding entities working together, in various examples. If a failure of one of the workers is detected, then, in some examples, the failed worker is replaced with a replacement worker. In some examples, the replacement worker is a new worker. In other examples, the worker is rebooted, and after the worker is rebooted, the rebooted worker is used as the replacement worker. In some examples, the scheduler client and the orchestrator work together to assign a replacement worker.

In some examples, the combined features of scalability, fault tolerance, and auto-scaling as discussed above may allow a parallel computing job to performed in a cloud-native manner, and in a manner that is elastic and interruptible. In some examples, these features of system 400 accordingly allow hyperscale HPC workloads to run on spot VMs. For instance, in some examples, each of the VMs VM1-VM6 of FIG. 4 may be spot VMs. In some examples in which the clusters use spot VMs, each cluster is divided into two or more separate node pools: at least one node pool that uses one or more spot VMs, and at least one node pool that uses one or more non-spot VMs. In some examples, VMs in the pool with spot VMs are used in preference to the VMs in the node pool with non-spot VMs where possible.

In some examples of system 400, local VM 450 is on the cloud. In some examples, local VM 450 is not part of system 400, and instead client device 441 performs the functionality discussed above with regard to local VM 450. Also, some of the functionality described above as being performed by local VM 450 may instead by performed in the clusters and/or in one or more other suitable devices in some examples. Similarly, some of the functionality described above as being performed in the clusters may instead be performed by local VM 450, client device 450, and/or in in other suitable devices in some examples. Also, some of the functionality described as being performed by the orchestrator may instead be performed by another suitable service on the cluster, by local VM 450, by client device 441, in another suitable device, and/or the like.

System 400 may include more or less devices than illustrated in FIG. 4, which is shown by way of example only. For instance, while two clusters are literally illustrated in FIG. 4, in other examples, there may be only one cluster, or there may be three or more clusters. Similarly, while two scheduler clients are literally shown in FIG. 4, in other examples, there may be only one scheduler client, or there may be three or more scheduler clients.

As discussed above, in some examples, auto-scaling may be used in each cluster, so that initially only one VM is assigned to the job in each cluster, but additional VMs may subsequently be assigned according the resource demands of the job, so that a cluster may include many more than three VMs in some examples. Also, although each of the VMs in the clusters has two workers in the example illustrated FIG. 4, in various other examples, each VM may instead have one worker, four workers, five workers, eight workers, or some other suitable number of workers. These variations and other suitable variations may be employed in various examples.

Illustrative Processes

Figure 5:
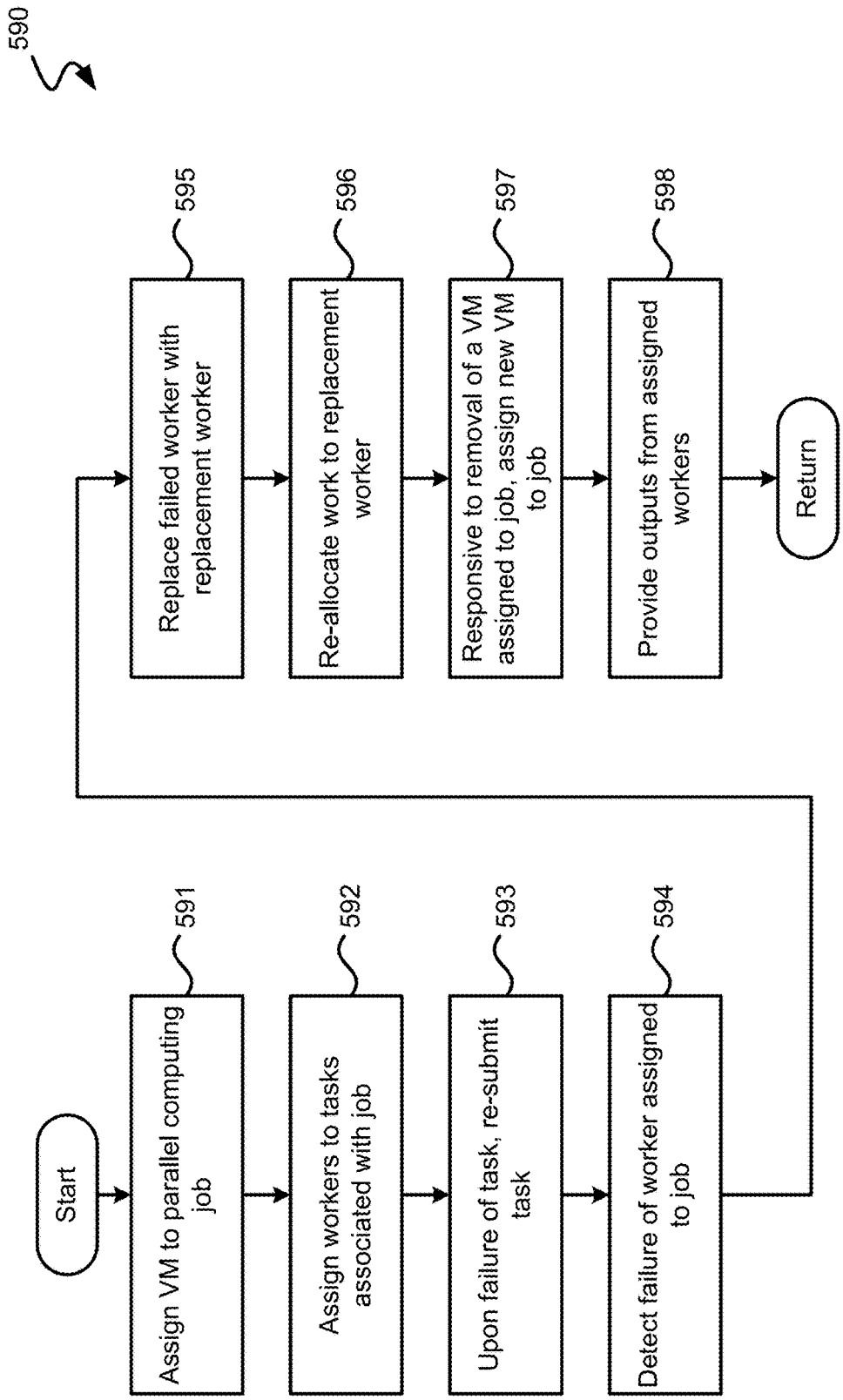
FIG. 5 is a flow diagram illustrating an example process for resilient and adaptive cloud processing of parallel computing workloads, in accordance with aspects of the disclosure.

FIG. 5 is a diagram illustrating an example dataflow for a process (590) for intelligent table suggestion and conversion for text. FIG. 5 and the corresponding description of FIG. 5 in the specification illustrate an example process for illustrative purposes that do not limit the scope of the disclosure.

In the illustrated example, first, step 591 occurs. At step 591, in some examples, for at least a first cluster of virtual machines that is assigned to a first job, an initial assignment of at least one virtual machine in the first cluster of virtual machines to the first job is made. In some examples, the first job is a parallel-computing job. As shown, step 592 occurs next in some examples. In step 592, in some examples, for at least the first cluster of virtual machines that is assigned to the first job, workers are assigned to a plurality of tasks that is associated with the first job. In some examples, the workers are associated with the virtual machines that are assigned to the first job.

As shown, step 593 occurs next in some examples. In step 593, in some examples, upon failure of a task of the plurality of tasks by one of assigned workers, the failed task is re-submitted. As shown, step 594 occurs next in some examples. In step 594, in some examples, a failure of one of the workers assigned to the first job is detected. As shown, step 595 occurs next in some examples. In step 595, in some examples, upon detecting the failure of one of the workers assigned to the first job, the failed worker is replaced with a replacement worker.

As shown, step 596 occurs next in some examples. In step 596, in some examples, work associated with the failed worker is re-allocated to the replacement worker. As shown, step 597 occurs next in some examples. In step 597, in some examples, for at least the first cluster of virtual machines that is assigned to the first job, responsive to removal of a virtual machine among the virtual machines assigned to the first job, a new virtual machine is assigned to the first job. As shown, step 598 occurs next in some examples. In step 598, in some examples, outputs are provided from the assigned workers. In some examples, the process then advances to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

What is claimed is:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
for at least a first cluster of virtual machines that is assigned to a first job, making an initial assignment of at least one virtual machine in the first cluster of virtual machines to the first job, wherein the first job is a parallel-computing job;
for at least the first cluster of virtual machines that is assigned to the first job, assigning assigned workers to a plurality of tasks that is associated with the first job, wherein the assigned workers are associated with different virtual machines within the first cluster of virtual machines that are assigned to the first job;
upon detecting a failure of a task of the plurality of tasks by one of the assigned workers assigned to the first job, re-submitting the failed task;
detecting the failure of the task by the one of the assigned workers assigned to the first job, the one of the assigned workers assigned to the first job comprising a failed worker;
upon detecting the failure of the task by the failed worker, replacing the failed worker with a replacement worker;
re-allocating work associated with the failed worker to the replacement worker;
for at least the first cluster of virtual machines that is assigned to the first job, responsive to removal of a virtual machine among the first cluster of virtual machines assigned to the first job, assigning a new virtual machine to the first job; and
providing outputs from the assigned workers.

2. The apparatus of claim 1, wherein at least one virtual machine of the first cluster of virtual machines assigned to the first job is a spot virtual machine.

3. The apparatus of claim 1, wherein the actions further include: enabling input data associated with the first job to be provided to the assigned workers.

4. The apparatus of claim 1, wherein the first cluster of virtual machines assigned to the first job includes a first node pool and a second node pool, wherein the first node pool includes a plurality of spot virtual machines, and wherein the second node pool includes a plurality of virtual machines that are not spot virtual machines.

5. The apparatus of claim 1, wherein the parallel computing job is at least one of a visual rendering job, an inversion problem, or a simulation problem.

6. The apparatus of claim 1, wherein the actions further include: assigning at least one additional cluster of virtual machines to the first job.

7. The apparatus of claim 6, wherein at least one cluster of the clusters assigned to the first job is in a different geographic region than at least one other cluster of the clusters assigned to the first job.

8. The apparatus of claim 1, wherein the actions further include: managing a quantity of virtual machines assigned to the first job responsive to resource requirements of the first job.

9. The apparatus of claim 8, wherein the managing of the quantity of virtual machines assigned to the first job includes increasing the quantity of virtual machines assigned to the first job based on resource requirements of the first job.

10. The apparatus of claim 8, wherein the managing of the quantity of virtual machines assigned to the first job includes decreasing the quantity of virtual machines assigned to the first job based on a completion of at least one task that is associated with the first job.

11. A method, comprising:
receiving a first job, wherein the first job is a parallel-computing job;
formulating a procedure that corresponds to the first job and a plurality of tasks that correspond to the first job;
causing an initiation of at least a first cluster of virtual machines among a plurality of clusters of virtual machines;
assigning one or more of the clusters of virtual machines from among the plurality of clusters of virtual machines to the first job, including at least the first cluster of virtual machines;
for each cluster of virtual machines from the one or more clusters of virtual machines assigned to the first job, determining an initial number of virtual machines to assign to the first job;
communicating the plurality of tasks to the one or more clusters of virtual machines assigned to the first job;
managing a quantity of virtual machines assigned to the first job responsive to resource requirements of the first job;
determining whether one of the tasks of the plurality of tasks has failed;
upon determining that one of the tasks of the plurality of tasks has failed, re-submitting the task;
responsive to removal of a virtual machine that is assigned to the first job, enabling assignment of a new virtual machine to the first job;
receiving outputs from each virtual machine assigned to the first job; and
processing the received outputs according to the first job.

12. The method of claim 11, further comprising:
for each cluster of virtual machines from the one or more clusters of virtual machines that is assigned to the first job, assigning the tasks of the plurality of tasks to workers, wherein the workers are associated with the virtual machines that are assigned to the first job;
detecting a failure of one of the workers assigned to the first job;
upon detecting the failure of one of the workers assigned to the first job, causing the failed worker to be replaced with a replacement worker; and
causing work associated with the failed worker to the replacement worker to be reallocated to the replacement worker.

13. The method of claim 11, further comprising:
assigning at least one additional cluster of virtual machines to the first job.

14. The method of claim 11, wherein the first cluster of virtual machines assigned to the first job includes a first node pool and a second node pool, wherein the first node pool includes a plurality of spot virtual machines, and wherein the second node pool includes a plurality of virtual machines that are not spot virtual machines.

15. The method of claim 11, wherein managing the quantity of virtual machines assigned to the first job includes increasing the quantity of virtual machines assigned to the first job based on resource requirements of the first job.

16. The method of claim 11, wherein managing the quantity of virtual machines assigned to the first job includes decreasing the quantity of virtual machines assigned to the first job based on a completion of at least one task that is associated with the first job.

17. A processor-readable storage medium, having stored thereon processor-executable code that, upon execution by at least one processor, enables actions, comprising:
for at least a first cluster of virtual machines that is assigned to a first job:
receiving a plurality of tasks that are associated with the first job, wherein the first job is a parallel-computing job;
making an initial assignment of one or more virtual machines of the first cluster of virtual machines to the first job;
making an assignment of assigned workers to a plurality of tasks that is associated with the first job, wherein the assigned workers are associated with the one or more virtual machines that are assigned to the first job;
responsive to a failed task comprising a failure of a task of the plurality of tasks by one of the assigned workers, re-allocating the failed task;
responsive to detecting a failure associated with a failed worker of one of the assigned workers assigned to the first job, replacing the failed worker with a replacement worker;
re-allocating work associated with the failed worker to the replacement worker;
responsive to removal of a virtual machine among the one or more virtual machines of the first cluster of virtual machines assigned to the first job, assigning a new virtual machine to the first job; and
providing outputs from the assigned workers.

18. The processor-readable storage medium of claim 17, wherein at least one of the one or more the virtual machines of the first cluster assigned to the first job is a spot virtual machine.

19. The processor-readable storage medium of claim 17, the actions further comprising: enabling input data associated with the first job to be provided to the assigned workers.

* * * * *